United States Patent [19]

Böniger

[11] 4,224,662

[45] Sep. 23, 1980

[54] POWER SUPPLY UNIT FOR A PLASMA PLANT

[75] Inventor: Paul Böniger, Huebstrasse 18, CH-8437 Zurzach, Switzerland

[73] Assignee: Paul Boniger, Zurzach, Switzerland

[21] Appl. No.: 894,619

[22] Filed: Apr. 10, 1978

[51] Int. Cl.[2] .......................................... H02M 7/155

[52] U.S. Cl. ...................................... 363/87; 363/45

[58] Field of Search .................... 176/19 EC; 310/11; 361/230; 363/44, 45, 47, 48, 53, 54, 79, 81, 83, 85, 87, 88, 128, 129, 130

[56] References Cited

U.S. PATENT DOCUMENTS

| | | | |
|---|---|---|---|
| 3,465,234 | 9/1969 | Phadke | 363/78 |
| 3,467,848 | 9/1969 | Ainsworth | 363/51 |
| 3,683,262 | 8/1972 | Neusser et al. | 363/87 X |
| 3,792,340 | 2/1974 | Sheinkman et al. | 310/11 X |
| 3,832,620 | 8/1974 | Pollard | 363/129 X |

OTHER PUBLICATIONS

The Marconi Review, First Quarter 1962, "Special Stabilized Power Supplies", p. 81.

*Primary Examiner*—William M. Shoop
*Attorney, Agent, or Firm*—Fitzpatrick, Cella, Harper & Scinto

[57] ABSTRACT

A power supply unit for a plasma plant, in particular for a plasma spraying plant, comprises an isolating transformer for connection to three-phase mains, a current control array and a rectifier array. The rectifier array comprises silicon wafer thyristors in a three-phase bridge configuration, which thyristors are electronically controlled through a current control loop, and an exterior voltage control loop is provided for additional electronic control of the silicon wafer thyristors.

In the output from the thyristor array, a filter with a transient voltage suppressor may be provided as high-frequency protection and with di/dt limitation.

1 Claim, 2 Drawing Figures

POWER SUPPLY UNIT FOR A PLASMA PLANT

Figure 1:
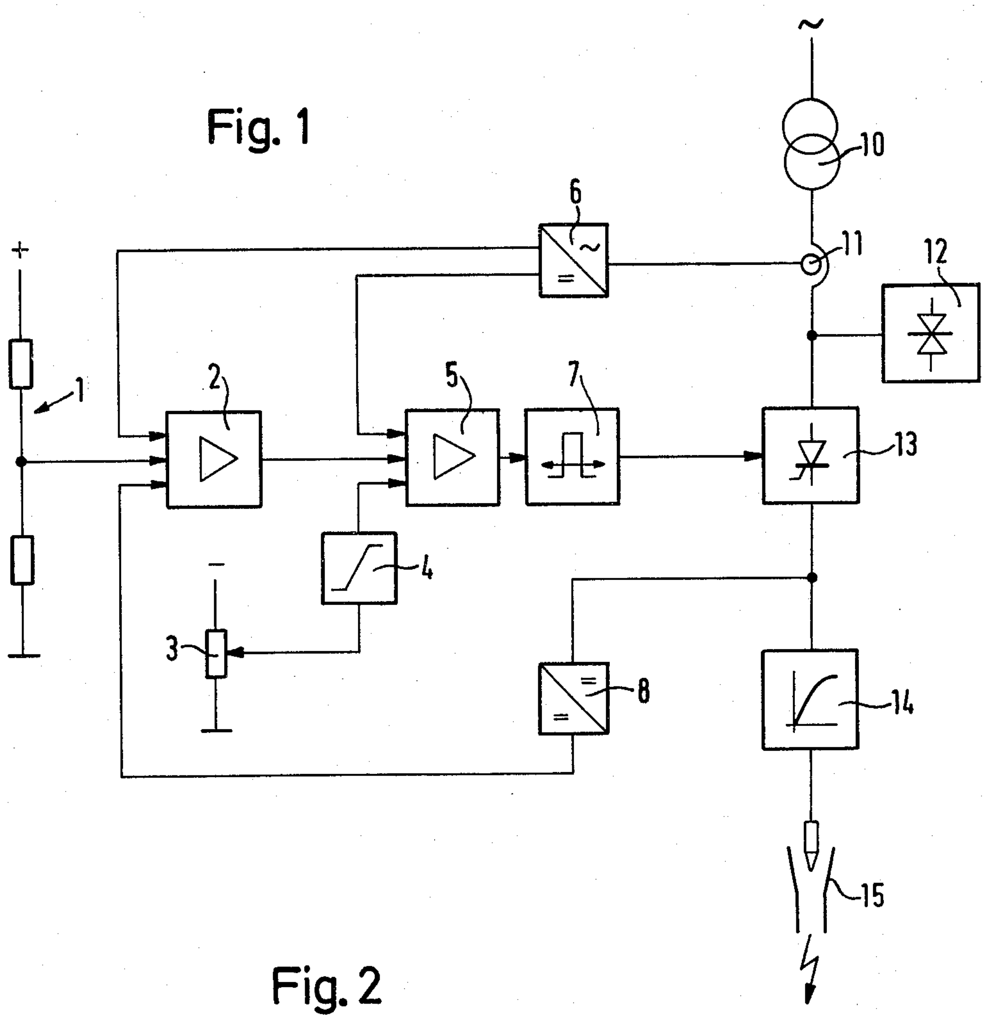

The present invention relates to a power supply unit for a plasma plant, in particular for a plasma spraying plant comprising a isolating transformer for connection to three-phase mains, a current control array and a rectifier array.

In a known power supply unit of the aforedefined type the voltage of the three-phase mains is transferred through reduction in the isolating transformer, the induced current is controlled through transducers and then rectified through silicon diodes. The rectified current reaches the plasma burner itself via a series reactor. The plasma current is measured and the magnetization of the transducers is varied through a three-step controller and a regulating transformer as a function of the current measurement data. Short-circuit or excessive current leads to disconnection of the rectifier via a current relay.

The plasma burner itself is not only connected with the power supply unit which supplies the burner with the plasma current as the operating current, but also with a high-frequency firing means which contributes to firing of the arc in the plasma burner. The plasma current is controlled at a comparatively low rate; in the event of excessive current or shortcircuit the entire rectifier array must be disconnected.

It is an object of the present invention to provide a power supply unit of the kind defined by way of introduction, which allows a very exact and rapid control of the plasma current and simultaneous effective and safe maintaining of the no-load voltage of the unit at a predetermined value.

In accordance with the present invention this problem is solved by such a unit wherein the rectifier array comprises silicon wafer thyristors in a three-phase bridge configuration, which thyristors are electronically controlled through a current control loop, and wherein an exterior voltage control loop is provided for additional electronic control of the silicon wafer thyristors.

Such power supply unit allows very rapid, exact and infinite control of the plasma current and is insensitive to mains voltage variations. For reasons of low dissipation the efficiency of the power supply unit is high. As a consequence of the permanent current control, moreover inadvertent shut-down does not take place, not even when short-circuit arises, as also an occurring short-circuit current can be substantially limited to the predetermined plasma current value.

The no load voltage can be set to a value below the prescribed or recommended values of e.g. 75 V d.c. potential. As a consequence of exact plasma current control a more favourable down-time of the plasma burner is achieved than with known systems. Finally, the power supply unit is considerably lighter and compacter and yet more easily accessible in design than known power supply units.

The exterior voltage control loop's design is expediently such that, with zero potential, the loop is controlled to have a predetermined no-load voltage and, with current flowing, to have a voltage maximum that can be reached. Due to this design, the limited no-load voltage and the quick-response current control dynamic current peaks are avoided when the arc is fired in the plasma burner.

It is expedient to provide, at the thyristor array output, a filter with a transient voltage suppressor as high-frequency protection and with di/dt limitation. The transient voltage suppressor is advantageously an avalanche diode. By means of this filter a hard output characteristic curve is achieved for the plasma current, i.e. the voltage characteristic curve has a sharp break. Moreover, by means of this filter the a.c. current energy which is superposed to the plasma current can be exactly controlled.

It is also an advantage when, at the thyristor array input, a transient voltage suppressor is provided. The two output terminals of the filter are expediently directly connected with high-frequency chokes.

A galvanic separation of the electronic control system from the plasma current circuit contributes to increased operating safety.

Finally, the nominal value of the plasma current is advantageously set through a follow-up integrator which can be set on a time basis.

The drawing shows one embodiment of the invention which will be described in detail in the following.

Figure 2:
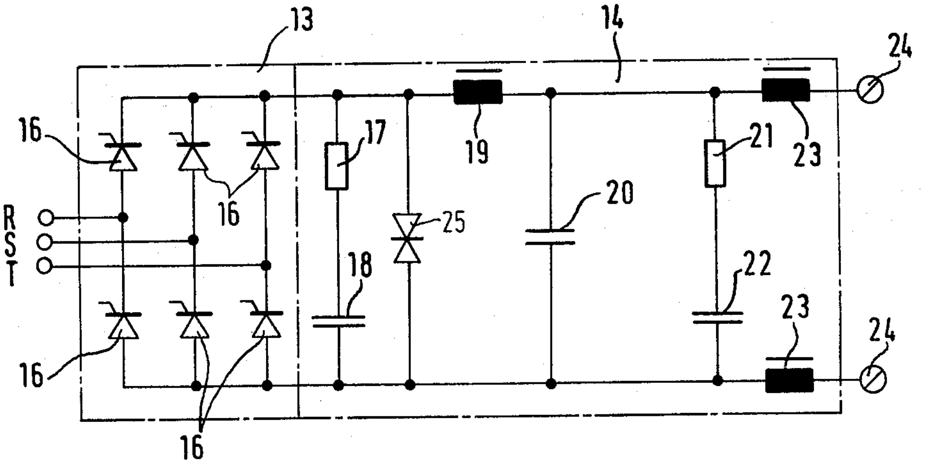

In the drawing:

FIG. 1 is a circuit diagram of a power supply unit for a plasma plant according to the invention, and FIG. 2 a wiring diagram of the thyristor array for the power supply unit of FIG. 1, in combination with a succeeding filter.

The power supply unit shown in FIG. 1 comprises a voltage divider 1 at which the nominal voltage of the unit for no-load operation, i.e. no-load voltage, is set. The voltage rating is set at a voltage regulator 2; to the input of the regulator both the voltage of the plasma burner 15 and the plasma current itself are returned via a current transformer 11 immediately succeeding an isolating transformer 10 from the network and through a current transformer load 6. The output of the voltage regulator 2 is switched to a current controller 5. The current controller 5 receives its current rating via a potentiometer 3 and a follow-up integrator 4. The plasma current is carried to the input of the current controller 5, and that also via the current transformer 11 and the current transformer load 6.

The current controller 5 operates a control set 7 which in its turn controls the thyristors of a thyristor array 13 in three-phase bridge configuration.

The thyristor array 13 is connected, at its input, to the isolating transformer 10 and, at its output, to a filter 14. At the output of the thyristor array 13 the actual value for the voltage regulator 2 is picked off through a d.c./d.c. transformer 8. At the input side of the thyristor array 13 a transient voltage suppressor 12 is provided. The plasma burner 15 is connected to the output of the filter 14.

The thyristors of the thyristor array 13 are silicon wafer thyristors which are arranged in a three-phase bridge configuration. Current and voltage of the thyristor array are simultaneously controlled by recification in the silicon wafer thyristors, which results in a very rapid and low-loss control.

The plasma current is subject to constant monitoring and control.

Due to the afore-described configuration, an overload of the power supply unit cannot arise since even in the event of short-circuit the plasma current remains below the rated value and as therefore the power supply unit need not be switched off. The electronic plasma control to the rating set at the potentiometer 3 is realized very quickly and very exactly.

Prior to firing of the arc in the plasma burner 15 the unit is controlled, by means of the voltage regulator 2, to have a no-load voltage which is so high that ionization can take place in the plasma burner when the high-frequency voltage occurs. Hence application of a radio voltage to the plasma burner leads to immediate firing. The resulting current, however, cannot produce a surge of overcurrent, which is due to the provided control means, not even dynamically.

After firing a particular overflow control entirely controls the exterior voltage control loop through the current so that the voltage is available which can be achieved when necessary at maximum. In operation, only the constant plasma current is subject to control through the inner current regulator loop. However, when the plasma current drops to zero the exterior voltage control loop again resumes control in view of the predetermined no-load voltage.

The above-described control system is not only extremely rapid, but the power supply unit is also insensitive to voltage variations. For instance, it may be possible that ±10% voltage variations occur within certain intervals or permanently without taking an influence on operation of the power supply unit.

The follow-up integrator 4, through which the plasma current rating which is set at the potentiometer 3 is passed on to the current regulator 5, can be set in view of time. The overvoltage protector 12 provided at the input side of the thyristor array 13 renders excessive voltage and du/dt peaks ineffective.

FIG. 2 is a schematic diagram of the thyristor array 13 and the succeeding filter 14. The thyristor array 13 comprises six thyristors 16 arranged in a three-phase bridge configuration and is switched to the input terminals of the filter 14 through its output terminals. The input of the filter 14 is bridged by an RC element in the form of a series circuit of a resistor 17 with a capacitor 18. As a high-frequency protection of the thyristor array 13 at the a.c. side a transient voltage suppressor 25 is connected in parallel to the RC element. It is expedient when the transient voltage suppressor 25 is an avalanche-type diode.

To the filter 14 then succeeds a serially connected choke 19 and a transversely connected filter capacitor 20. Another RC element, which comprises a resistor 21 and a capacitor 22, is connected parallel to the filter capacitor 20 and the output terminals. The two outer terminals of this RC element are respectively switched to the output terminals 24 of the filter 14 through a high-frequency choke 23. Hence the filter 14 is composed of a system that is capable to oscillate and offers additionally a high-frequency protection and di/dt limitation.

By the filter 14 a hard output characteristic of the output current is achieved, i.e. a voltage characteristic with a sharp break is reached. Moreover it is possible to exactly control the plasma current with respect to the superposed a.c. energy. This means also a considerable improvement of the down-time of the anodes and cathodes of the plasma burner 15, i.e. of the nozzles and the electrodes.

The power supply unit with the particular filter 14, which has been described in the foregoing, hence has not a dropping but a comparatively immobile voltage characteristic as far as the plasma current at the plasma burner 15 is involved. Moreover, the power supply unit offers adaptive voltage regulation as a function of the plasma current. As long as plasma current is flowing the maximum voltage is permanently available. What I claim is:

1. A power supply unit for a plasma plant, in particular for a plasma spraying plant, comprising an isolating transformer for connection to the main supply, a current controller and a thyristor assembly, the thyristor assembly being connected through a current control loop with a circuit supplied on the one hand with a reference voltage and on the other hand with the voltage existing at the plasma burner, and a potentiometer for adjusting the arc current, characterized in that (a) said circuit is formed as voltage regulator (2) permitting setting of a desired voltage for no-load operation, (b) the voltage regulator (2) is adapted to receive the plasma current by means of a current transformer (11), (c) the output of the voltage regulator is connected with the input of the current controller (5), (d) the current controller (5) is adapted to have its desired current value applied by means of said potentiometer (3) and additionally by means of a follow-up integrator (4) disposed in series to the tap of the potentiometer (3), (e) the input of the current controller (5) is adapted to receive the plasma current by means of the current transformer, and (f) the output of the current controller is connected to a control unit for the thyristor assembly (13).

* * * * *

UNITED STATES PATENT AND TRADEMARK OFFICE
CERTIFICATE OF CORRECTION

PATENT NO. : 4,224,662

DATED : September 23, 1980

INVENTOR(S) : Paul Boniger

It is certified that error appears in the above—identified patent and that said Letters Patent is hereby corrected as shown below:

On the title page, Item [30] should read:

April 13, 1977 Germany 2716332

Signed and Sealed this

*Tenth* Day of *February 1981*

[SEAL]

*Attest:*

RENE D. TEGTMEYER

*Attesting Officer* *Acting Commissioner of Patents and Trademarks*

UNITED STATES PATENT AND TRADEMARK OFFICE

CERTIFICATE OF CORRECTION

PATENT NO. : 4,224,662

DATED : September 23, 1980

INVENTOR(S) : PAUL BÖNIGER

It is certified that error appears in the above-identified patent and that said Letters Patent are hereby corrected as shown below:

On the title page:

"[73] Assignee: Paul Boniger, Zurzach, Switzerland" should read --Plasmainvent AG, a Corporation of Switzerland--.

Signed and Sealed this

*Twenty-seventh* Day of *July 1982*

[SEAL]

*Attest:*

GERALD J. MOSSINGHOFF

*Attesting Officer* *Commissioner of Patents and Trademarks*